(12) United States Patent
Kubusch et al.

(10) Patent No.: US 7,530,414 B2
(45) Date of Patent: May 12, 2009

(54) INDUSTRIAL TOW TRUCK WITH ELECTRICAL TRACTION DRIVE

(75) Inventors: Dietmar Kubusch, Buchholz (DE); Torsten Leifert, Vögelsen (DE)

(73) Assignee: Still GmbH, Hamburg (DE)

( * ) Notice: Subject to any disclaimer, the term of this patent is extended or adjusted under 35 U.S.C. 154(b) by 27 days.

(21) Appl. No.: 10/886,520

(22) Filed: Jul. 7, 2004

(65) Prior Publication Data

US 2005/0029022 A1 Feb. 10, 2005

(30) Foreign Application Priority Data

Jul. 8, 2003 (DE) ................ 103 30 814

(51) Int. Cl.
B60K 1/04 (2006.01)
(52) U.S. Cl. .............. 180/65.3; 180/65.1; 903/908
(58) Field of Classification Search ............. 180/65.1, 180/65.3, 65.4, 68.5; 429/12, 13
See application file for complete search history.

(56) References Cited

U.S. PATENT DOCUMENTS

| | | | | |
|---|---|---|---|---|
| 3,708,028 A | * | 1/1973 | Hafer ................. | 180/65.1 |
| 5,452,983 A | * | 9/1995 | Parmley, Sr. ............. | 414/345 |
| 6,183,894 B1 | * | 2/2001 | Adzic et al. ............... | 429/13 |
| 6,370,903 B1 | * | 4/2002 | Wlech .................. | 62/324.6 |
| 6,380,637 B1 | * | 4/2002 | Hsu et al. ............... | 290/1 R |
| 6,445,080 B1 | * | 9/2002 | Daqoa et al. ............ | 307/9.1 |
| 6,571,542 B1 | * | 6/2003 | Fillman et al. ........... | 56/10.6 |
| 6,722,460 B2 | * | 4/2004 | Yang et al. .............. | 180/220 |
| 6,793,027 B1 | * | 9/2004 | Yamada et al. .......... | 180/65.1 |
| 6,805,984 B2 | * | 10/2004 | Harth ..................... | 429/13 |
| 6,899,062 B2 | * | 5/2005 | Bruck et al. ............ | 123/41.31 |
| 6,953,099 B2 | * | 10/2005 | Kawasaki et al. ........ | 180/65.1 |
| 6,991,051 B2 | * | 1/2006 | Swindell et al. ........ | 180/65.1 |

FOREIGN PATENT DOCUMENTS

| | | |
|---|---|---|
| DE | 10330816.4 | 7/2003 |
| EP | 1 215 163 A1 * | 6/2002 |

* cited by examiner

*Primary Examiner*—Frank B Vanaman
(74) *Attorney, Agent, or Firm*—The Webb Law Firm

(57) ABSTRACT

An industrial tow truck (1) includes an electrical traction drive system. At least one fuel cell unit (9) is used as the energy supply for the electrical traction drive system.

3 Claims, 2 Drawing Sheets

INDUSTRIAL TOW TRUCK WITH ELECTRICAL TRACTION DRIVE

CROSS REFERENCE TO RELATED APPLICATION

This application claims priority to German Application No. 103 30 814.8 filed Jul. 8, 2003, which corresponds to US 2005/0029022, which is herein incorporated by reference in its entirety.

BACKGROUND OF THE INVENTION

1. Field of the Invention

This invention relates to an industrial tow truck with an electrical traction drive.

2. Technical Considerations

Industrial tow trucks are industrial trucks that do not have load-lifting devices and are used for the internal transport of goods in a plant or on a site. For this purpose, one or more trailers that carry the goods to be transported are connected to the tow truck by means of a trailer hitch device. The tow trucks can also be equipped with their own load carrying platforms and can thus be used for the transport of relatively small loads. Examples of vehicles of this general type are manufactured and sold by STILL GmbH under model numbers R06, R07, and R08.

In contrast to industrial trucks that have load-lifting devices (such as fork-lift trucks, for example, which are seldom used to transport large loads over long distances either indoors or outdoors, such as through large industrial plants) industrial tow trucks frequently travel relatively long distances both inside and outside enclosed spaces. For emissions-free operation indoors, the traction drive system most frequently used is electrical. However, the range of battery-powered vehicles is relatively low in comparison to the range of vehicles that are powered by internal combustion engines. Battery-powered vehicles also require relatively long times out of operation on account of the long recharging times for the batteries. On vehicles that are used both outdoors and indoors, a hybrid drive is also frequently used, in which there is an internal combustion engine as well as a battery. When a hybrid drive system of this type is used, the time the truck must be out of operation can of course be reduced because the vehicle can be refueled relatively quickly. However, the drive system is relatively complex and heavy on account of the need for two different energy sources, which results in increased manufacturing costs. On vehicles that have their own load carrying platform, the use of hybrid drive systems also results in a reduction of the load carrying capacity.

Therefore, it is an object of the invention to provide an industrial tow truck with an electrical traction drive that has a long operating time and can be operated indoors.

SUMMARY OF THE INVENTION

The invention teaches that at least one fuel cell unit can be used to supply energy to the electrical drive system of the tow truck. Fuel cell systems generate practically no harmful emissions and are, therefore, particularly well suited for use indoors. At the same time, on account of their high efficiency in the utilization of the energy in the fuel, they have a long operating time and, thus, give the vehicle a longer range. In vehicles with a load carrying platform, the load carrying capacity can also be increased on account of the low weight of the fuel cell system.

In one advantageous realization of the invention, a replaceable fuel reservoir is provided. Because of the ability to replace the reservoir quickly, the need to take the tow truck out of operation for a long period of time while the reservoir is refueled is eliminated. At the same time, the type and capacity of the reservoir can thereby be adapted quickly to meet current operating requirements.

In an additional advantageous realization of the invention, the fuel reservoir and fuel cell unit can be realized in the form of a device that can be replaced as a unit. Consequently, the fuel that is being used can be replaced quickly, whereby it becomes possible to achieve an optimal coordination between the fuel cell, the energy reservoir, and the fuel that is being used.

It is appropriate if hydrogen is used as the fuel. The emissions from a fuel cell system that is operated with hydrogen are primarily water vapor, which means that no harmful emissions are generated when the system is operated indoors.

It is, likewise, of particular advantage if a fuel that is liquid at room temperature, such as methanol, is used for the operation of the fuel cell unit. Fuels that are liquid at room temperature are easy to store and make refueling the vehicle easy.

It is thereby advantageous if the fuel cell unit is realized in the form of a direct fuel cell. Fuel cells of this type for the use of fuels that are liquid at room temperature, such as methanol, for example, do not have a reformer to convert the fuel and, therefore, make a particularly simple design and construction possible.

It is particularly advantageous if the waste heat of the fuel cell unit is used to heat the driver's cab. This method makes it unnecessary to have any additional heating elements that convert electric current into heat. A lower energy consumption and a simpler construction can thereby be achieved.

BRIEF DESCRIPTION OF THE DRAWING

Additional advantages and details of the invention are explained in greater detail below with reference to the exemplary embodiment that is illustrated in the accompanying schematic drawings, in which.

DESCRIPTION OF THE PREFERRED EMBODIMENT

Figure 1:
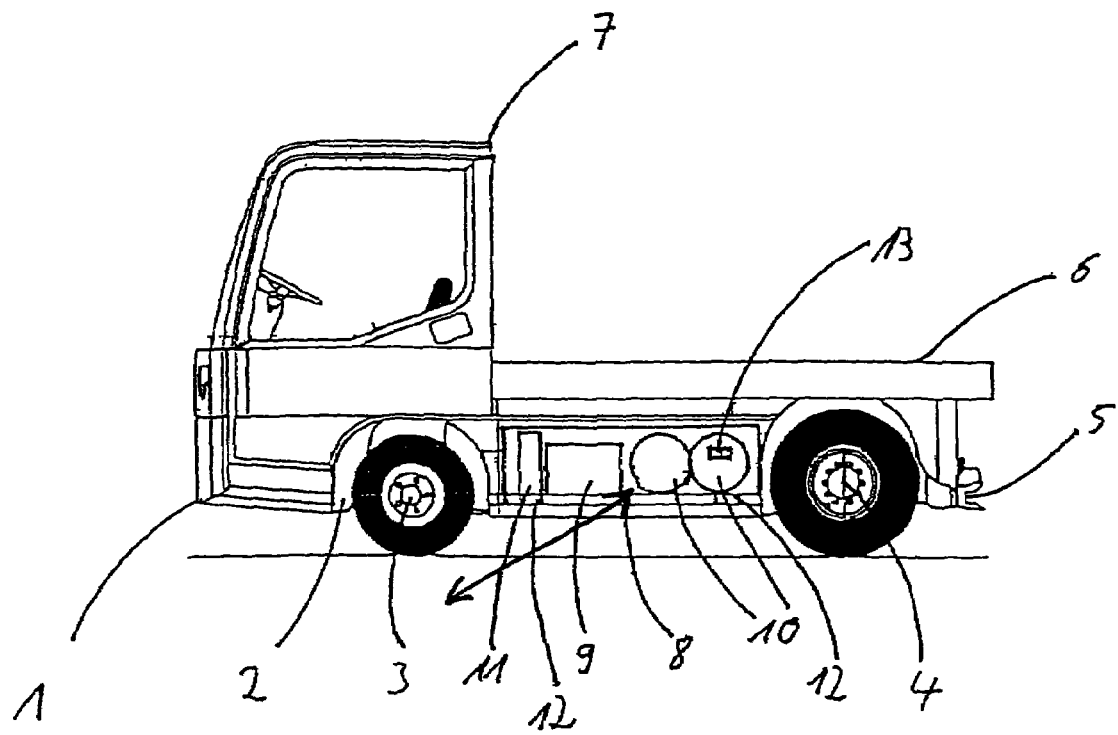
FIG. 1 illustrates an industrial tow truck incorporating features of the invention.

An industrial tow truck 1 of the invention includes a frame 2 that supports the major elements of the vehicle 1. These major elements include the steerable front axle 3, the rear axle 4 with conventional electrical traction drive motors (not shown), a trailer hitch device 5, a load carrying platform 6, and a conventional device (also not shown) to control the electrical functions, such as the functions of the traction drive motors, for example. The operator sits in a driver's cab 7 and from there controls the vehicle 1. Trailers to transport loads can be connected to the trailer hitch 5 and can thereby be towed by the vehicle 1. The load carrying platform 6 can be used to transport small loads.

In the space between the axles 3, 4 underneath the load carrying platform 6, a fuel cell system 8 is attached, which includes a fuel cell unit 9, a fuel reservoir 10, and an electronic control system 11. On industrial trucks of the known art, a battery is typically located in this area. The individual components of the fuel cell system 8 are configured as appropriate for the fuel being used. In this manner, for example, when the truck is operated with hydrogen, the fuel reservoir 10 can be realized in the form of a low-temperature pressurized tank or in the form of a metal hydride storage device. When the fuel cell system is operated with fuel that is liquid at room temperature, such as methanol, for example, the fuel container 10 can be realized in a relatively simple manner. In this case, when conventional fuel cells are used, a reformer is necessary to decompose the fuel into molecules that can be used in the fuel cell, and additional space is required for that operation. However, the amount of space available for installation on relatively compact industrial tow trucks is limited. As a result of the use of direct fuel cells, in which the reformer is not needed to decompose the fuel, compact dimensions can also be achieved when methanol is used as the fuel.

Hydrogen is a particularly appropriate fuel when the vehicles are to be operated for extended periods indoors because hydrogen does not generate hazardous emissions. If the vehicle is also used outdoors, it can be expected to have to travel longer distances and will, therefore, require more frequent refueling. When methanol, which is liquid at room temperature, is used, less complex devices can be used, for example on the fuel containers and connecting lines, which makes operation with methanol easier to realize than operation with hydrogen.

In the illustrated exemplary embodiment, the fuel cell system 8 can be removed as a unit, for which purpose there are slots or receptacles 12 for the tines of a fork-lift truck or lift truck. If the fuel reservoir 10 is empty, it can either be refilled by means of a refueling device 13 or the entire unit 8 can be removed and replaced. In this manner, it is also possible, for example, to easily replace a fuel cell system 8 that is based on a hydrogen supply with a system that is operated using methanol. However, realizations are also conceivable in which all the components are permanently installed on the vehicle 1 or in which only the fuel reservoir 10 is replaceable, as shown by the double-headed arrow in FIG. 1.

There can be corresponding connections and lines that are not shown in the illustrations for the control and monitoring functions of the fuel cell system 8 that are performed by the operator in the driver's cab 7. There can also be means (not shown) to conduct the waste heat from the fuel cell system 8 into the heating and air-conditioning system (not shown) for the driver's cab 7 and to use the waste heat to heat the driver's cab 7 when the truck is being operated in a cold environment or to cool the driver's cab 7 when the truck is being operated in a warm environment. This feature also results in additional energy savings compared to a battery-powered vehicle because, in battery-powered vehicles, the heating or cooling power must be provided by means of electrical devices that require additional electrical energy and, thus, also discharge the battery more rapidly. A particularly useful heating system is disclosed in US 2005/0034905 A1, herein incorporated by reference in its entirety.

The mounting devices for the fuel cell system 8 in the frame 2 can be appropriately realized so that conventional batteries can also be used in place of the fuel cell system 8. As a result, when the vehicle 1 is operated as one of an existing fleet of battery-operated vehicles, the energy sources (battery system or fuel cell system) can be replaced easily and quickly.

Figure 2:
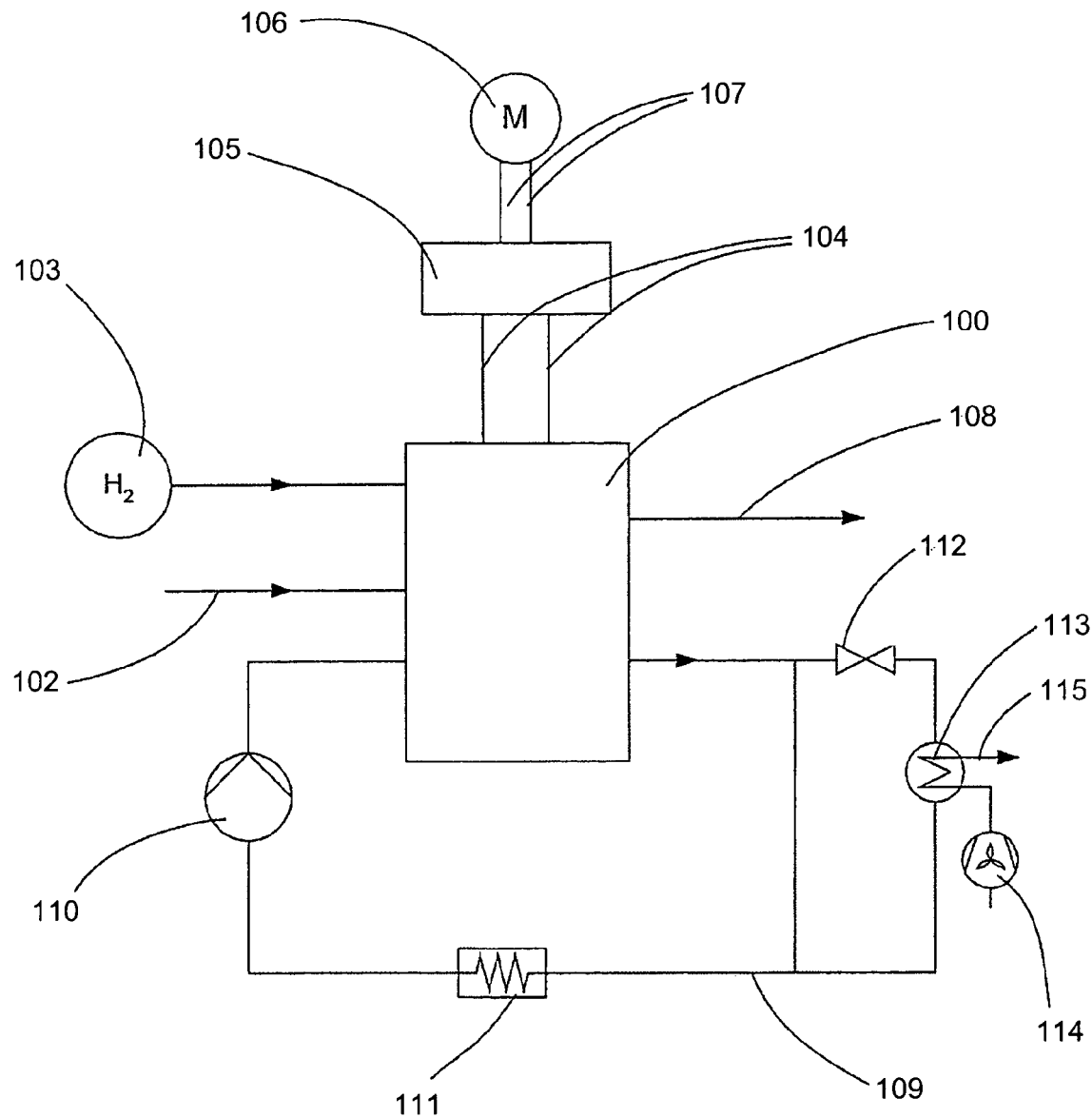
FIG. 2 is a schematic illustration of the energy supply of an industrial truck of the invention with a hot air blower.

FIG. 2 is a schematic illustration of the energy supply of an industrial truck of the invention utilizing a conventional hot air blower. A fuel cell system 100 is supplied with ambient air via a feed line 102. Hydrogen fuel is supplied from a reservoir 103. The current generated in the fuel cell system is conducted by means of the lines 104 to an electrical control unit 105, from which the individual consumers, represented in the illustrated embodiment by an electrical drive motor 106, are supplied with electrical energy via the lines 107. During the operation of the fuel cell system 100, the oxygen contained in the atmospheric air fed into the system is converted into water with the hydrogen that is supplied from the reservoir 103. This water is present in the form of water vapor in the exhaust air, which is discharged to the atmosphere via the line 108. The fuel cell system 100 is cooled by a cooling circuit 109 in which a pump 110 transports water through the fuel cell system 100. The heat absorbed by the cooling water is discharged to the atmosphere via the radiator 111.

However, in the practice of the invention, by means of a valve 112, a heat exchanger 113 is connected to the cooling circuit 109 to which air is delivered by an air blower 114. The heated air is transported via a line 115 to the operator's position (not shown here). In this case, the operator's position can be considered the area of the industrial truck or the area in the immediate vicinity of the industrial truck in which an operator is located during the operation of the industrial truck to operate the functions of the industrial truck. This area can be, for example, an enclosed or open cab with a driver's seat, a platform for the operator to stand on, or the area from which the tow bar of a lift truck can be operated.

The amount of heat put out by the heater can be controlled by the amount of cooling water that is fed to the heat exchanger 113, which can be regulated by means of the valve 112, as well as by means of the amount of air that is delivered by the air blower 114. These variables can be regulated automatically as in the known art for conventional hot-air heaters that are heated using liquids, or manually by a pre-selection by the operator of the desired amount of heat. The operation and control of such conventional hot-air heaters will be well understood by one of ordinary skill in the art and, therefore, will not be discussed in detail.

The heated air can be discharged in the operator's position through outlets and can thus be used, for example, to heat a driver's cab. The heat can also be transported through one or more control elements or into a driver's seat to heat them. This latter method is particularly advantageous in vehicles with an open operator's position.

In fuel cell systems that are operated with hydrogen, the exhaust gas consists primarily of heated air that has an elevated concentration of water vapor and a reduced concentration of oxygen. In driver's positions that have sufficient air circulation, this air can be used either directly or it can also be mixed with ambient air for heating via air outlet openings. It is also within the scope of the invention that the current of exhaust gas can be transported through a driver's seat or through one or more of the control elements. The temperature can thereby be regulated as in the known art, for example, by regulating the air flow or by adding cooler outside air.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial tow truck for indoor and outdoor use, comprising:
   a driver's cab;
   a frame having a lateral opening, the lateral opening being defined by upper and lower portions and by forward and rearward portions of the frame;
   a front axle spaced from a rear axle, the driver's cab being disposed above the front axle and the upper, lower, forward and rearward portions of the frame defining the lateral opening being positioned between the front and rear axles;

a flat load carrying platform extending from a rear of the driver's cab over at least the rear axle for transporting loads, the flat load carrying platform being disposed above the frame; and a fuel cell system removably positioned within the frame between the axles and under the load carrying platform such that the fuel cell system is laterally removable through the lateral opening, the fuel cell system configured to supply energy to a drive system, wherein the fuel cell system comprises a fuel cell unit, a fuel reservoir, and an electronic control system mounted on a support, wherein the support has receptacles configured to engage tines of a lift truck such that selectively the fuel cell system is replaceable as a unit or at least the fuel reservoir of the fuel cell system is replaceable separately on the support, and wherein the fuel cell system is selectively replaceable such that the tow truck includes a hydrogen fuel cell unit when the tow truck is used indoors and the tow truck includes a fuel cell unit operated by fuel that is a liquid at room temperature when the tow truck is used outdoors.

2. The industrial tow track as claimed in claim 1, wherein the fuel that is liquid at room temperature is methanol.

3. The industrial tow truck as claimed in claim 1, wherein the fuel cell unit operated by fuel that is a liquid at room temperature for outdoor use of the tow truck is a direct fuel cell.

* * * * *

UNITED STATES PATENT AND TRADEMARK OFFICE
CERTIFICATE OF CORRECTION

| | | |
|---|---|---|
| PATENT NO. | : 7,530,414 B2 | Page 1 of 1 |
| APPLICATION NO. | : 10/886520 | |
| DATED | : May 12, 2009 | |
| INVENTOR(S) | : Kubusch et al. | |

It is certified that error appears in the above-identified patent and that said Letters Patent is hereby corrected as shown below:

Column 6, line 10, Claim 2, "tow track" should read -- tow truck --

Signed and Sealed this

Twenty-second Day of September, 2009

David J. Kappos
*Director of the United States Patent and Trademark Office*